United States Patent
Shiga et al.

(10) Patent No.: US 9,371,436 B2
(45) Date of Patent: Jun. 21, 2016

(54) RESIN COMPOSITION FOR GOLF BALL AND GOLF BALL

(71) Applicant: DUNLOP SPORTS CO. LTD., Kobe-shi, Hyogo (JP)

(72) Inventors: Kazuyoshi Shiga, Kobe (JP); Yasuo Kubota, Kobe (JP); Takahiro Shigemitsu, Kobe (JP)

(73) Assignee: DUNLOP SPORTS CO. LTD., Kobe-shi (JP)

( * ) Notice: Subject to any disclaimer, the term of this patent is extended or adjusted under 35 U.S.C. 154(b) by 204 days.

(21) Appl. No.: 14/465,034

(22) Filed: Aug. 21, 2014

(65) Prior Publication Data

US 2015/0057103 A1    Feb. 26, 2015

(30) Foreign Application Priority Data

Aug. 22, 2013 (JP) ................. 2013-172399

(51) Int. Cl.

| | |
|---|---|
| *A63B 37/00* | (2006.01) |
| *C08K 5/09* | (2006.01) |
| *C08K 5/17* | (2006.01) |
| *C08K 5/19* | (2006.01) |
| *C08K 3/22* | (2006.01) |
| *C08K 5/521* | (2006.01) |
| *C08K 5/20* | (2006.01) |
| *C08K 5/32* | (2006.01) |
| *C08L 23/08* | (2006.01) |

(52) U.S. Cl.
CPC .............. *C08K 5/19* (2013.01); *A63B 37/0039* (2013.01); *A63B 37/0051* (2013.01); *A63B 37/0059* (2013.01); *A63B 37/0073* (2013.01); *A63B 37/0074* (2013.01); *A63B 37/0075* (2013.01); *A63B 37/0076* (2013.01); *C08K 3/22* (2013.01); *C08K 5/09* (2013.01); *C08K 5/175* (2013.01); *C08K 5/20* (2013.01); *C08K 5/32* (2013.01); *C08K 5/521* (2013.01); *C08L 23/08* (2013.01); *C08K 2003/2224* (2013.01)

(58) Field of Classification Search
None
See application file for complete search history.

(56) References Cited

U.S. PATENT DOCUMENTS

| | | | |
|---|---|---|---|
| 2013/0079178 A1 | 3/2013 | Shiga et al. | |
| 2013/0172112 A1* | 7/2013 | Kanemitsu | A63B 37/0059 473/372 |
| 2015/0375051 A1* | 12/2015 | Shiga | C08K 3/36 473/374 |

FOREIGN PATENT DOCUMENTS

JP    2013-78563 A    5/2013

* cited by examiner

*Primary Examiner* — David Buttner
(74) *Attorney, Agent, or Firm* — Birch, Stewart, Kolasch & Birch, LLP

(57) ABSTRACT

The present invention provides a resin composition for golf balls that is excellent in resilience, flexibility, and fluidity. The present invention also provides a golf ball excellent in resilience, shot feeling, and productivity. The present invention includes a resin composition for golf balls including: (A) at least one selected from the group consisting of (a-1) a bipolymer of an olefin and a $C_3$-$C_8$ α,β-unsaturated carboxylic acid, (a-2) a metal ion-neutralized product of a bipolymer of an olefin and a $C_3$-$C_8$ α,β-unsaturated carboxylic acid, (a-3) a terpolymer of an olefin, a $C_3$-$C_8$ α,β-unsaturated carboxylic acid, and an α,β-unsaturated carboxylic acid ester, and (a-4) a metal ion-neutralized product of a terpolymer of an olefin, a $C_3$-$C_8$ α,β-unsaturated carboxylic acid, and an α,β-unsaturated carboxylic acid ester; (B) a compound containing an unsaturated hydrocarbon chain, a cationic moiety, and an anionic moiety in its molecule; and (C) an unsaturated fatty acid.

10 Claims, 2 Drawing Sheets

RESIN COMPOSITION FOR GOLF BALL AND GOLF BALL

TECHNICAL FIELD

The present invention relates to a resin composition for golf balls and a golf ball including the resin composition.

BACKGROUND ART

Golf balls of various structures have been proposed, such as one-piece golf balls which consist of a golf ball body; two-piece golf balls which include a core and a cover; three-piece golf balls which include a core having a center and a single intermediate layer covering the center, and a cover covering the core; and multi-piece golf balls which include a core having a center and two or more intermediate layers covering the center, and a cover covering the core.

Ionomer resins are widely used as a material for golf balls because such resins enable to produce golf balls which have high rigidity and fly a long distance. In particular, highly resilient materials are desired for golf balls. Ionomer resins having a higher degree of neutralization are known to achieve higher resilience but tend to simultaneously increase hardness, thus reducing flexibility and deteriorating shot feeling.

In consideration of the above problem, proposed is a method of reducing hardness while enhancing resilience by adding a large amount of fatty acid (metallic soap) to a highly neutralized ionomer resin. However, unfortunately, the acid component of the fatty acid consumes metal ions used for neutralization, thus preventing the highly neutralized resin from sufficiently providing a resilience-enhancing effect. Therefore, the method cannot sufficiently enhance flexibility and resilience in terms of producing golf balls satisfactory both in shot feeling and resilience. In addition, the method requires a large amount of metal component.

For example, Patent Literature 1 discloses a resin composition for golf balls providing excellent resilience and flexibility by adding a compound containing a hydrocarbon chain, a cationic moiety, and an anionic moiety in its molecule, such as oleyl betaine. However, this resin composition exhibits lower fluidity, thereby resulting in a reduction in productivity and processability. Accordingly, there is a need in the art for resin compositions for golf balls that simultaneously have excellent resilience, flexibility, and processability (fluidity).

CITATION LIST

Patent Literature

Patent Literature 1: JP 2013-78563 A

SUMMARY OF INVENTION

Technical Problem

The present invention aims to solve the problems by providing a resin composition for golf balls that is excellent in resilience, flexibility, and fluidity. The present invention also aims to provide a golf ball excellent in resilience, shot feeling, and productivity.

Solution to Problem

The present invention relates to a resin composition for golf balls, including: (A) at least one selected from the group consisting of (a-1) a bipolymer of an olefin and a $C_3$-$C_8$ α,β-unsaturated carboxylic acid, (a-2) a metal ion-neutralized product of a bipolymer of an olefin and a $C_3$-$C_8$ α,β-unsaturated carboxylic acid, (a-3) a terpolymer of an olefin, a $C_3$-$C_8$ α,β-unsaturated carboxylic acid, and an α,β-unsaturated carboxylic acid ester, and (a-4) a metal ion-neutralized product of a terpolymer of an olefin, a $C_3$-$C_8$ α,β-unsaturated carboxylic acid, and an α,β-unsaturated carboxylic acid ester; (B) a compound containing an unsaturated hydrocarbon chain, a cationic moiety, and an anionic moiety in its molecule; and (C) an unsaturated fatty acid.

The compound (B) is preferably an amphoteric surfactant.

The amphoteric surfactant is preferably at least one selected from the group consisting of betaine amphoteric surfactants, amide amino acid amphoteric surfactants, alkylamino fatty acid salts, alkyl amine oxides, β-alanine amphoteric surfactants, glycine amphoteric surfactants, sulfobetaine amphoteric surfactants, and phosphobetaine amphoteric surfactants.

The unsaturated fatty acid (C) is preferably at least one selected from the group consisting of oleic acid, linoleic acid, linolenic acid, elaidic acid, stearolic acid, ricinoleic acid, ricinelaidic acid, and their branched isomers.

The resin composition for golf balls preferably includes the compound (B) in an amount of 1 to 200 parts by mass for each 100 parts by mass of a resin component of the resin composition.

The resin composition for golf balls preferably includes the unsaturated fatty acid (C) in an amount of 1 to 200 parts by mass for each 100 parts by mass of a resin component of the resin composition.

The resin composition for golf balls preferably includes (D) a basic inorganic metal compound in an amount of 100 parts by mass or less for each 100 parts by mass of a resin component of the resin composition.

A mass ratio of the compound (B) to the unsaturated fatty acid (C) preferably ranges from 0.5/99.5 to 30/70.

The present invention relates to a golf ball, including: a mono- or multi-layered core; and a cover covering the core, wherein at least one layer of the core is formed from the resin composition for golf balls.

The present invention also relates to a one-piece golf ball, including a golf ball body formed from the resin composition for golf balls.

Advantageous Effects of Invention

According to the present invention, a compound containing an unsaturated hydrocarbon chain, a cationic moiety, and an anionic moiety in its molecule, and an unsaturated fatty acid are mixed with a specific resin. This enables to provide a resin composition for golf balls that is excellent in resilience, flexibility, and fluidity. Thus, the present invention aims to provide a golf ball excellent in resilience, shot feeling, and productivity.

DESCRIPTION OF EMBODIMENTS

Figure 1:
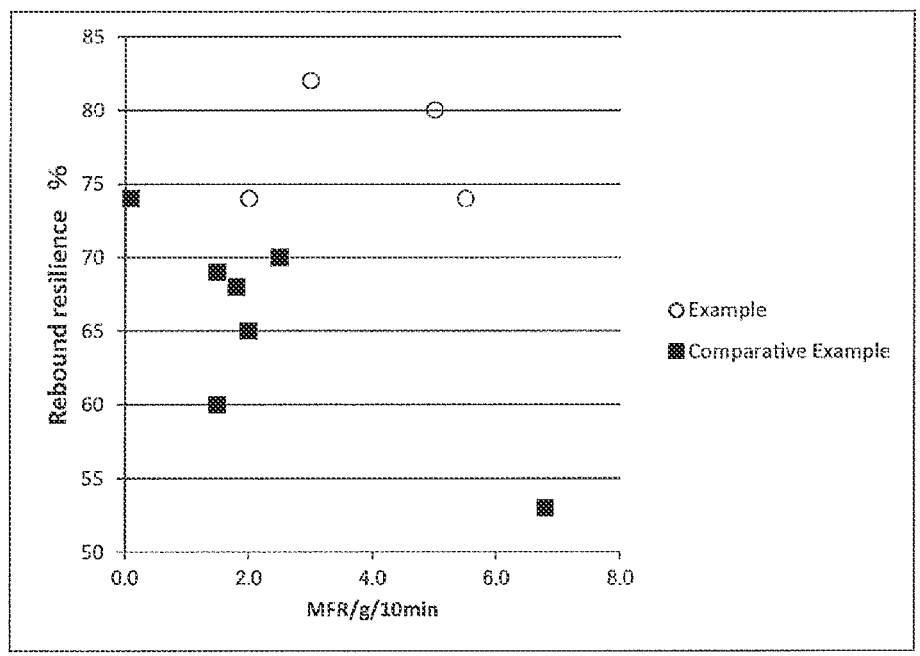
FIG. 1 is a graph showing the relationships between rebound resilience and melt flow rate (MFR) in the examples and the comparative examples in Table 1.
Figure 2:
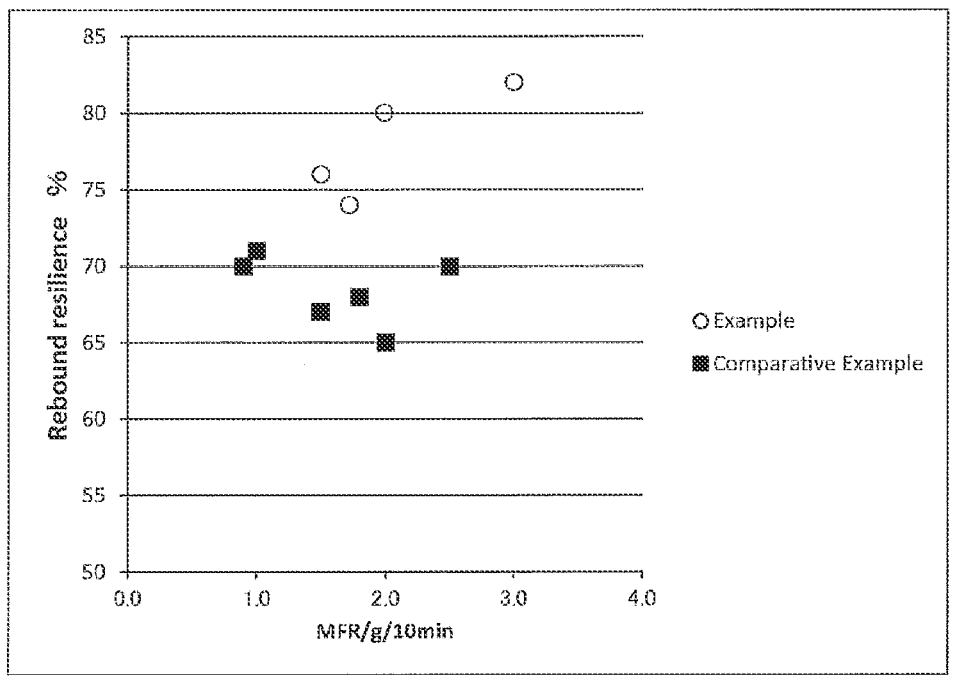
FIG. 2 is a graph showing the relationships between rebound resilience and MFR in the examples and the comparative examples in Table 2.
Figure 3:
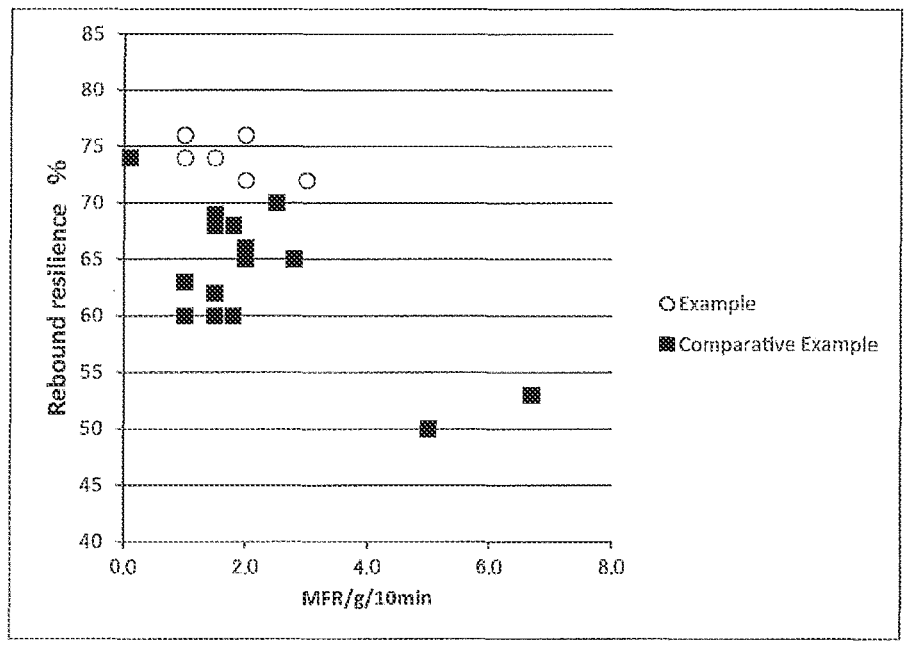
FIG. 3 is a graph showing the relationships between rebound resilience and MFR in the examples and the comparative examples in Table 3.
Figure 4:
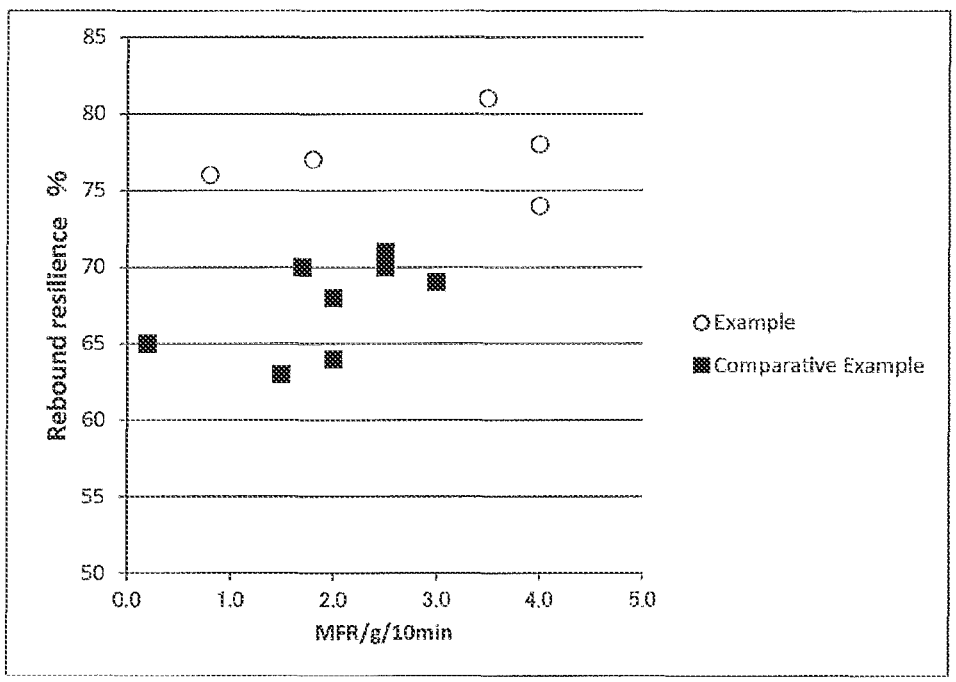
FIG. 4 is a graph showing the relationships between rebound resilience and MFR in the examples and the comparative examples in Table 4.

The resin composition for golf balls of the present invention includes: (A) at least one selected from the group consisting of (a-1) a bipolymer of an olefin and a $C_3$-$C_8$ α,β-unsaturated carboxylic acid, (a-2) a metal ion-neutralized product of a bipolymer of an olefin and a $C_3$-$C_8$ α,β-unsaturated carboxylic acid, (a-3) a terpolymer of an olefin, a $C_3$-$C_8$ α,β-unsaturated carboxylic acid, and an α,β-unsaturated carboxylic acid ester, and (a-4) a metal ion-neutralized product of a terpolymer of an olefin, a $C_3$-$C_8$ α,β-unsaturated carboxylic acid, and an α,β-unsaturated carboxylic acid ester; (B) a compound containing an unsaturated hydrocarbon chain, a cationic moiety, and an anionic moiety in its molecule; and (C) an unsaturated fatty acid.

As mentioned above, the addition of a compound containing a hydrocarbon chain, a cationic moiety, and an anionic moiety in its molecule to a specific resin enables to enhance both flexibility and resilience, but the resulting resin composition unfortunately has lower fluidity. In contrast, the addition of a compound containing an unsaturated hydrocarbon chain, a cationic moiety, and an anionic moiety in its molecule, and additionally an unsaturated fatty acid enables resin compositions to not only provide good flexibility and resilience but also to offer excellent fluidity (processability), resulting in balanced improvements in these performance properties. Thus, golf balls excellent in resilience, shot feeling, and productivity can be provided. These effects are considered to be produced as follows.

When, in particular, an unsaturated fatty acid functioning as a plasticizer is added in addition to a compound containing an unsaturated hydrocarbon chain, a cationic moiety, and an anionic moiety in its molecule, such as oleyl betaine, it is considered that the compound such as oleyl betaine exhibits an affinity for the unsaturated fatty acid, and thus both components are simultaneously involved into ionic aggregates of an ionomer resin, which makes it possible to improve fluidity while maintaining high resilience and flexibility, so that balanced improvements in these performance properties can be achieved.

First, the components (a-1) to (a-4) used as a resin component (A) in the present invention will be described below.

The component (a-1) is a bipolymer of an olefin and a $C_3$-$C_8$ α,β-unsaturated carboxylic acid, and is a nonionic one in which the carboxyl groups of the copolymer are not neutralized. The component (a-2) is a metal ion-neutralized product of a bipolymer of an olefin and a $C_3$-$C_8$ α,β-unsaturated carboxylic acid, and may be an ionomer resin in which at least part of the carboxyl groups of the copolymer is neutralized with a metal ion.

The component (a-3) is a terpolymer of an olefin, a $C_3$-$C_8$ α,β-unsaturated carboxylic acid, and an α,β-unsaturated carboxylic acid ester, and is a nonionic one in which the carboxyl groups of the copolymer are not neutralized. The component (a-4) is a metal ion-neutralized product of a terpolymer of an olefin, a $C_3$-$C_8$ α,β-unsaturated carboxylic acid, and an α,β-unsaturated carboxylic acid ester, and may be an ionomer resin in which at least part of the carboxyl groups of the copolymer is neutralized with a metal ion.

In the present invention, the "bipolymer (a-1) of an olefin and a $C_3$-$C_8$ α,β-unsaturated carboxylic acid", the "ionomer resin consisting of (a-2) a metal ion-neutralized product of a bipolymer of an olefin and a $C_3$-$C_8$ α,β-unsaturated carboxylic acid", the "terpolymer (a-3) of an olefin, a $C_3$-$C_8$ α,β-unsaturated carboxylic acid, and an α,β-unsaturated carboxylic acid ester", and the "ionomer resin consisting of (a-4) a metal ion-neutralized product of a terpolymer of an olefin, a $C_3$-$C_8$ α,β-unsaturated carboxylic acid, and an α,β-unsaturated carboxylic acid ester" may also be referred to simply as "bipolymer", "binary ionomer resin", "terpolymer", and "ternary ionomer resin", respectively.

In the components (a-1) to (a-4), the olefin is preferably a $C_2$-$C_8$ olefin, such as, for example, ethylene, propylene, butene, pentene, hexene, heptene, and octene, with ethylene being particularly preferred. Examples of the $C_3$-$C_8$ α,β-unsaturated carboxylic acids include acrylic acid, methacrylic acid, fumaric acid, maleic acid, and crotonic acid, particularly preferably acrylic acid or methacrylic acid. Examples of the α,β-unsaturated carboxylic acid esters include methyl, ethyl, propyl, n-butyl and isobutyl esters of acrylic acid, methacrylic acid, fumaric acid, maleic acid, and the like, with acrylic or methacrylic acid esters being particularly preferred.

The bipolymer (a-1) is preferably a bipolymer of ethylene and (meth)acrylic acid. The binary ionomer resin (a-2) is preferably a metal ion-neutralized product of a bipolymer of ethylene and (meth)acrylic acid. The terpolymer (a-3) is preferably a terpolymer of ethylene, (meth)acrylic acid, and a (meth)acrylic acid ester. The ternary ionomer resin (a-4) is preferably a metal ion-neutralized product of a terpolymer of ethylene, (meth)acrylic acid, and a (meth)acrylic acid ester. The term "(meth)acrylic acid" herein means acrylic acid and/or methacrylic acid.

The $C_3$-$C_8$ α,β-unsaturated carboxylic acid content in the bipolymer (a-1) or terpolymer (a-3) is preferably 4% by mass or more, and more preferably 5% by mass or more. The content is also preferably 30% by mass or less, and more preferably 25% by mass or less.

The bipolymer (a-1) or terpolymer (a-3) preferably has a melt flow rate (190° C., 2.16 kg load) of 5 g/10 min or higher, more preferably 10 g/10 min or higher, and still more preferably 15 g/10 min or higher. The melt flow rate is also preferably 1700 g/10 min or lower, more preferably 1500 g/10 min or lower, and still more preferably 1300 g/10 min or lower. When the melt flow rate is 5 g/10 min or higher, the resin composition for golf balls has good fluidity and therefore is easy to mold into a member of a golf ball. Also, when the melt flow rate is 1700 g/10 min or lower, golf balls having better durability can be obtained.

Specific examples (indicated by trade name) of the bipolymer (a-1) include ethylene-methacrylic acid copolymers available from Du Pont-Mitsui Polychemicals Co., Ltd. under the trade name "NUCREL (registered trademark) (e.g. "NUCREL N 1050H", "NUCREL N 2050H", "NUCREL N 1110H", "NUCREL N 0200H", "NUCREL N 1560")", and an ethylene-acrylic acid copolymer available from The Dow Chemical Company under the trade name "PRIMACOR (registered trademark) 5980I".

Specific examples (indicated by trade name) of the terpolymer (a-3) include "NUCREL (registered trademark) (e.g. "NUCREL AN 4318", "NUCREL AN 4319")" available from Du Pont-Mitsui Polychemicals Co., Ltd., "NUCREL (registered trademark) (e.g. "NUCREL AE")" available from Du Pont, and "PRIMACOR (registered trademark) (e.g. "PRIMACOR AT 310", "PRIMACOR AT 320")" available from The Dow Chemical Company. The bipolymers (a-1) or terpolymers (a-3) may be used alone or in combination of two or more.

The $C_3$-$C_8$ α,β-unsaturated carboxylic acid content in the binary ionomer resin (a-2) is preferably 8% by mass or more, more preferably 10% by mass or more, and still more preferably 12% by mass or more. The content is also preferably 30% by mass or less, and more preferably 25% by mass or less. When the content is 8% by mass or more, members having a desired resilience can be easily obtained. Also, when the content is 30% by mass or less, members which do not have too high a melt viscosity and thus provide good moldability can be obtained.

The degree of neutralization of the carboxyl groups of the binary ionomer resin (a-2) is preferably 15 mol % or higher, and more preferably 20 mol % or higher. The degree of neutralization is also preferably 90 mol % or lower, and more preferably 85 mol % or lower. When the degree is 15 mol % or higher, golf balls having good resilience and durability can be obtained. Also, when the degree is 90 mol % or lower, the resin composition for golf balls has good fluidity.

The degree of neutralization of the carboxyl groups of the binary ionomer resin (a-2) can be determined by the following expression:

(Degree of neutralization of binary ionomer resin)=100×(the number of moles of neutralized carboxyl groups in binary ionomer resin)/(the total number of moles of carboxyl groups of binary ionomer resin).

Examples of metal ions capable of neutralizing at least part of the carboxyl groups of the binary ionomer resin (a-2) include: monovalent metal ions such as sodium, potassium, and lithium; bivalent metal ions such as magnesium, calcium, zinc, barium, and cadmium; trivalent metal ions such as aluminum; and other ions such as tin and zirconium.

Specific examples (indicated by trade name) of the binary ionomer resin (a-2) include "Himilan (registered trademark) (e.g. Himilan 1555 (Na), Himilan 1557 (Zn), Himilan 1605 (Na), Himilan 1706 (Zn), Himilan 1707 (Na), Himilan AM 7311 (Mg), Himilan AM 7329 (Zn))" available from Du Pont-Mitsui Polychemicals Co., Ltd. Examples thereof further include "Surlyn (registered trademark) (e.g. Surlyn 8945 (Na), Surlyn 9945 (Zn), Surlyn 8140 (Na), Surlyn 8150 (Na), Surlyn 9120 (Zn), Surlyn 9150 (Zn), Surlyn 6910 (Mg), Surlyn 6120 (Mg), Surlyn 7930 (Li), Surlyn 7940 (Li), Surlyn AD 8546 (Li))" available from Du Pont. Other examples include ionomer resins available from ExxonMobil Chemical such as "Iotek (registered trademark) (e.g. Iotek 8000 (Na), Iotek 8030 (Na), Iotek 7010 (Zn), Iotek 7030 (Zn))". The symbols such as Na, Zn, Li, and Mg in the parentheses following the trade names indicate the metal species of the metal ions for neutralization. The mentioned binary ionomer resins (a-2) may be used either alone or as a mixture of two or more kinds.

The binary ionomer resin (a-2) preferably has a bending rigidity of 140 MPa or higher, more preferably 150 MPa or higher, and still more preferably 160 MPa or higher. Also, the binary ionomer resin (a-2) preferably has a bending rigidity of 550 MPa or lower, more preferably 500 MPa or lower, and still more preferably 450 MPa or lower. Too low a bending rigidity tends to lead to golf balls with reduced resilience and therefore shorter flight distance. Too high a bending rigidity may lead to golf balls with reduced durability.

The binary ionomer resin (a-2) preferably has a melt flow rate (190° C., 2.16 kg load) of 0.1 g/10 min or higher, more preferably 0.5 g/10 min or higher, and still more preferably 1.0 g/10 min or higher. Also, the binary ionomer resin (a-2) preferably has a melt flow rate of 30 g/10 min or lower, more preferably 20 g/10 min or lower, and still more preferably 15 g/10 min or lower. When the melt flow rate is 0.1 g/10 min or higher, the resin composition for golf balls has good fluidity, and thus can be formed into a thin layer, for example. When the melt flow rate is 30 g/10 min or lower, golf balls having better durability can be obtained.

The binary ionomer resin (a-2) preferably has a slab hardness, measured in Shore D hardness, of 10 or higher, more preferably 15 or higher, and still more preferably 20 or higher. The slab hardness (Shore D hardness) is also preferably 75 or lower, more preferably 73 or lower, and still more preferably 70 or lower. When the slab hardness is 10 or higher, members having good resilience can be obtained. Also, when the slab hardness is 75 or lower, members which do not have too high a hardness can be obtained and therefore golf balls having better durability can be obtained.

The $C_3$-$C_8$ α,β-unsaturated carboxylic acid content in the ternary ionomer resin (a-4) is preferably 2% by mass or more, and more preferably 3% by mass or more. The content is also preferably 30% by mass or less, and more preferably 25% by mass or less.

The degree of neutralization of the carboxyl groups of the ternary ionomer resin (a-4) is preferably 20 mol % or higher, and more preferably 30 mol % or higher. The degree of neutralization is also preferably 90 mol % or lower, and more preferably 85 mol % or lower. When the degree is 20 mol % or higher, golf balls having good resilience and durability can be formed from the resin composition for golf balls. When the degree is 90 mol % or lower, the resin composition for golf balls has good fluidity.

The degree of neutralization of the carboxyl groups of the ternary ionomer resin (a-4) can be determined by the following expression:

(Degree of neutralization of ternary ionomer resin)=100×(the number of moles of neutralized carboxyl groups in ternary ionomer resin)/(the total number of moles of carboxyl groups of ternary ionomer resin).

Examples of metal ions capable of neutralizing at least part of the carboxyl groups of the ternary ionomer resin (a-4) include those listed for the binary ionomer resin (a-2). The ternary ionomer resin (a-4) is preferably one neutralized by magnesium ions. Neutralization by magnesium ions leads to high rebound resilience.

Specific examples (indicated by trade name) of the ternary ionomer resin (a-4) include "Himilan (registered trademark) (e.g. Himilan AM 7327 (Zn), Himilan 1855 (Zn), Himilan 1856 (Na), Himilan AM 7331 (Na))" available from Du Pont-Mitsui Polychemicals Co., Ltd. Other examples include ternary ionomer resins available from Du Pont such as "Surlyn 6320 (Mg), Surlyn 8120 (Na), Surlyn 8320 (Na), Surlyn 9320 (Zn), and Surlyn 9320W (Zn)". Further examples include ternary ionomer resins available from ExxonMobil Chemical such as "Iotek 7510 (Zn) and Iotek 7520 (Zn)". The symbols such as Na, Zn, and Mg in the parentheses following the trade names indicate the metal species of the metal ions for neutralization. The ternary ionomer resins (a-4) may be used either alone or in combination of two or more.

The ternary ionomer resin (a-4) preferably has a bending rigidity of 10 MPa or higher, more preferably 11 MPa or higher, and still more preferably 12 MPa or higher. Also, the ternary ionomer resin (a-4) preferably has a bending rigidity of 100 MPa or lower, more preferably 97 MPa or lower, and still more preferably 95 MPa or lower. Too low a bending rigidity tends to lead to golf balls with reduced resilience and therefore shorter flight distance. Too high a bending rigidity may lead to golf balls with reduced durability.

The ternary ionomer resin (a-4) preferably has a melt flow rate (190° C., 2.16 kg load) of 0.1 g/10 min or higher, more preferably 0.3 g/10 min or higher, and still more preferably 0.5 g/10 min or higher. Also, the ternary ionomer resin (a-4)

preferably has a melt flow rate of 70 g/10 min or lower, more preferably 60 g/10 min or lower, and still more preferably 55 g/10 min or lower. When the melt flow rate is 0.1 g/10 min or higher, the resin composition for golf balls has good fluidity and thus can be easily formed into a thin layer. Also, when the melt flow rate is 70 g/10 min or lower, golf balls having better durability can be obtained.

The ternary ionomer resin (a-4) preferably has a slab hardness, measured in Shore D hardness, of 1 or higher, more preferably 3 or higher, and still more preferably 5 or higher. The slab hardness (Shore D hardness) is also preferably 70 or lower, more preferably 65 or lower, and still more preferably 60 or lower. When the slab hardness is 1 or higher, members which are not too soft can be obtained and therefore golf balls having good resilience can be obtained. When the slab hardness is 70 or lower, members which are not too hard can be obtained and therefore golf balls having better durability can be obtained.

The resin composition for golf balls of the present invention preferably includes the terpolymer (a-3) or the ternary ionomer resin (a-4) as the resin component (A). In this case, members which are not too hard and thus provide high resilience can be obtained.

In preferred embodiments, the whole resin component of the resin composition for golf balls of the present invention only includes the aforementioned components (a-1) to (a-4). The resin composition may optionally include other thermoplastic elastomer(s) and/or thermoplastic resin(s) to the extent that they do not impair the effects of the present invention. When the resin composition contains other thermoplastic elastomer(s) and/or thermoplastic resin(s), the combined amount of the components (a-1) to (a-4) is preferably 50% by mass or more, more preferably 60% by mass or more, and still more preferably 70% by mass or more of the resin component of the resin composition.

The following describes the compound (B) containing an unsaturated hydrocarbon chain, a cationic moiety, and an anionic moiety in its molecule used in the present invention. Such a compound is not particularly limited as long as it contains any unsaturated hydrocarbon chain optionally substituted with a hydroxy group or other groups, any cationic moiety, and any anionic moiety. In particular, amphoteric surfactants can be suitably used.

The amphoteric surfactant refers to a surfactant containing a cationic moiety and an anionic moiety in its molecule. Examples thereof include betaine amphoteric surfactants (e.g. alkyl betaines, amido betaines, imidazolium betaines, alkyl sulfobetaines, amido sulfobetaines), amido amino acid amphoteric surfactants, alkylamino fatty acid salts, alkyl amine oxides, β-alanine amphoteric surfactants, glycine amphoteric surfactants, sulfobetaine amphoteric surfactants, and phosphobetaine amphoteric surfactants.

Examples of the alkyl betaine amphoteric surfactants include compounds represented by the following formula (1):

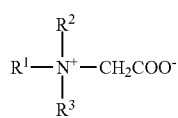

(1)

wherein $R^1$ represents a $C_8$-$C_{30}$ alkenyl group; and $R^2$ and $R^3$ are the same as or different from each other, and each represent a $C_1$-$C_{20}$ alkyl group or hydroxyalkyl group.

Examples of the amido betaine amphoteric surfactants include compounds represented by the following formula (2):

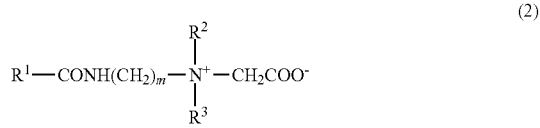

(2)

wherein $R^1$ represents a $C_8$-$C_{30}$ alkenyl group; $R^2$ and $R^3$ are the same as or different from each other, and each represent a $C_1$-$C_{20}$ alkyl group or hydroxyalkyl group; and m represents an integer of 1 to 5.

Examples of the imidazolium betaine amphoteric surfactants include compounds represented by the following formula (3):

(3)

wherein $R^1$ represents a $C_8$-$C_{30}$ alkenyl group; and p and q are the same as or different from each other, and each represent an integer of 1 to 5.

Examples of the alkyl sulfobetaine amphoteric surfactants include compounds represented by the following formula (4):

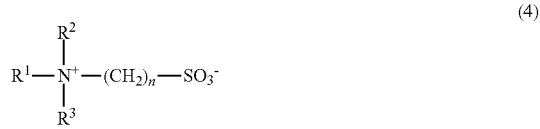

(4)

wherein $R^1$ represents a $C_8$-$C_{30}$ alkenyl group; $R^2$ and $R^3$ are the same as or different from each other, and each represent a $C_1$-$C_{20}$ alkyl group or hydroxyalkyl group; and n represents an integer of 1 to 5.

Examples of the amide amino acid amphoteric surfactants include compounds represented by the following formula (5):

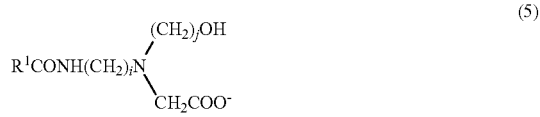

(5)

wherein $R^1$ represents a $C_8$-$C_{30}$ alkenyl group; and i and j are the same as or different from each other, and each represent an integer of 1 to 5.

Examples of the alkyl amine oxides include compounds represented by the following formula (6):

(6)

wherein $R^1$ represents a $C_8$-$C_{30}$ alkenyl group; and $R^2$ and $R^3$ are the same as or different from each other, and each represent a $C_1$-$C_{20}$ alkyl group or hydroxyalkyl group.

In the formulae (1) to (6), each of $R^1$ to $R^3$ may be linear or branched; at least one of $R^2$ to $R^3$ each preferably has 12 to 18 carbon atoms; $R^2$ and $R^3$ each preferably have 1 to 5 carbon atoms; and each of the symbols m, p, q, n, i, and j is preferably an integer of 1 to 3.

Examples of $R^1$ include alkenyl groups such as tetradecenyl, hexadecenyl, octadecenyl, isooctadecenyl, and eicosenyl; and mixtures thereof such as mixed alkyl groups including coconut oil alkyl groups, palm kernel oil alkyl groups, and beef tallow alkyl groups. Examples of $R^2$ and $R^3$ include methyl, ethyl, hydroxymethyl, and hydroxyethyl.

Specific examples of the amphoteric surfactant include dimethyl oleyl betaine, oleyl betaine, oleyl dihydroxymethyl betaine, cocamidopropyl betaine, cocamidodialkyl hydroxyalkyl sulfobetaines, and alkylamino fatty acid sodium salts.

Preferred among the above amphoteric surfactants are betaine amphoteric surfactants, more preferably alkyl betaine amphoteric surfactants represented by for example the formula (1), because they contribute to simultaneous achievement of resilience and flexibility. Particularly preferred are alkyl betaine amphoteric surfactants represented by the formula (1) in which $R^1$ is an alkenyl group because they have high affinity for the unsaturated fatty acid mentioned later and thus can further improve fluidity while maintaining resilience and flexibility, thereby significantly improving the balance between these performance properties.

The amount of the compound (B) containing an unsaturated hydrocarbon chain, a cationic moiety, and an anionic moiety in its molecule, for each 100 parts by mass of the resin component, is preferably 1 part by mass or more, more preferably 3 parts by mass or more, and still more preferably 10 parts by mass or more. The amount is also preferably 200 parts by mass or less, more preferably 150 parts by mass or less, and still more preferably 100 parts by mass or less. When the amount falls within the range mentioned above, balanced improvements in resilience and flexibility can be achieved.

Further, the following describes the unsaturated fatty acid (C) used in the present invention. Such an unsaturated fatty acid may be any unsaturated fatty acid optionally substituted with a hydroxy group or other groups. The unsaturated fatty acid may be a compound containing either a carbon-carbon double bond or a carbon-carbon triple bond, or both. Also, the unsaturated fatty acid may be either a compound having one unsaturated bond or a compound having two or more unsaturated bonds. The unsaturated fatty acid may be a linear, branched or cyclic compound, preferably a linear or branched compound.

The unsaturated fatty acid (C) is preferably an unsaturated higher fatty acid having 5 to 36 carbon atoms, more preferably 10 to 25 carbon atoms, and still more preferably 15 to 20 carbon atoms, in terms of improving fluidity while maintaining resilience and flexibility to thereby achieve the effects of the present invention well.

Specific examples of the unsaturated fatty acid (C) include oleic acid, erucic acid, linoleic acid, linolenic acid, elaidic acid, stearolic acid, ricinoleic acid, ricinelaidic acid, arachidonic acid, vaccenic acid, myristoleic acid, palmitoleic acid, and their branched isomers. Preferred among these are oleic acid, linoleic acid, linolenic acid, elaidic acid, stearolic acid, ricinoleic acid, ricinelaidic acid, and their branched isomers, more preferably oleic acid, linoleic acid, and ricinoleic acid, and particularly preferably oleic acid, because they provide excellent resilience, flexibility and fluidity. These may be used alone or in combination of two or more.

The amount of the unsaturated fatty acid (C) for each 100 parts by mass of the resin component is preferably 1 part by mass or more, more preferably 10 parts by mass or more, and still more preferably 50 parts by mass or more. Also, the amount is preferably 200 parts by mass or less, more preferably 150 parts by mass or less, and still more preferably 100 parts by mass or less. When the amount falls within the range mentioned above, fluidity can be improved while maintaining resilience and flexibility, so that the balance between these performance properties can be improved.

The mixing ratio of the compound (B) to the unsaturated fatty acid (C) [mass ratio of compound (B)/(unsaturated fatty acid (C))] is preferably 0.5/99.5 to 30/70, more preferably 1/99 to 20/80, and still more preferably 3/97 to 10/90. A mixing ratio less than 0.5/99.5 may fail to provide good rebound resilience. A mixing ratio more than 30/70 tends to fail to provide good rebound resilience and also tends to reduce fluidity.

The resin composition for golf balls of the present invention may include a basic inorganic metal compound (D). The basic inorganic metal compound (D) may optionally be added in order to neutralize unneutralized carboxyl groups in the component (A). Examples of the basic inorganic metal compounds (D) include elemental metals such as sodium, lithium, potassium, calcium, and magnesium; metal hydroxides such as magnesium hydroxide, calcium hydroxide, sodium hydroxide, lithium hydroxide, potassium hydroxide, and copper hydroxide; metal oxides such as magnesium oxide, calcium oxide, zinc oxide, and copper oxide; and metal carbonates such as magnesium carbonate, calcium carbonate, sodium carbonate, lithium carbonate, and potassium carbonate. These basic inorganic metal compounds (D) may be used alone or in combination of two or more. In particular, the basic inorganic metal compound (D) may suitably be magnesium hydroxide, calcium hydroxide, sodium carbonate, lithium carbonate, potassium carbonate, zinc oxide, or copper oxide.

The amount of the basic inorganic metal compound (D) for each 100 parts by mass of the resin component is preferably more than 0 parts by mass, and is more preferably 1 part by mass or more. Also, the amount is preferably 200 parts by mass or less, more preferably 100 parts by mass or less, and still more preferably 70 parts by mass or less. If the amount is too small, the amount of ionic aggregates may be too small, resulting in low resilience. If the amount is too large, durability may decrease.

The resin composition for golf balls of the present invention preferably has a total degree of neutralization defined by the equation below of 53% or higher, more preferably 60% or higher, and still more preferably 80% or higher. The total degree of neutralization is also preferably 1000% or lower, more preferably 700% or lower, still more preferably 400% or lower, and particularly preferably 300% or lower. When the total degree is 53% or higher, the amount of ionic aggregates is sufficiently large to increase resilience. When the total degree is 1000% or lower, the basic inorganic metal compound is so uniformly dispersed that durability can be enhanced.

$$\text{Total degree of neutralization (\%)} = \frac{\sum \left( \begin{pmatrix} \text{the number of moles of cationic components} \\ \text{in the resin compositon} \end{pmatrix} \times \right.}{\sum \left( \begin{pmatrix} \text{the number of moles of anionic components} \\ \text{in the resin compositon} \end{pmatrix} \times \right.} \times 100$$

In the equation, "Σ((the number of moles of cationic components in the resin composition)×(the valence of the cationic component))" refers to: (the number of moles of cationic components of the resin component (A))×(the valence of the cationic component)+(the number of moles of cation-forming groups or cationic components of the compound (B) containing an unsaturated hydrocarbon chain, a cationic moiety, and an anionic moiety in its molecule)×(the valence of the cation-forming group or cationic component)+(the number of moles of metal components of the basic inorganic metal compound (D))×(the valence of the metal component). $\Sigma$((the number of moles of anionic components in the resin composition)×(the valence of the anionic component))" refers to: (the number of moles of carboxyl groups of the resin component (A))+(the number of moles of anion-forming groups of the compound (B) containing an unsaturated hydrocarbon chain, a cationic moiety, and an anionic moiety in its molecule)×(the valence of the anion-forming group)+(the number of moles of carboxyl groups of the unsaturated fatty acid (C)).

It should be noted that the numbers of moles of cationic components, cation-forming groups, metal components, carboxyl groups, and anion-forming groups include the respective non-ionized precursors. The amounts of the cationic components, cation-forming group, and anion-forming group may be determined by, for example, neutralization titration.

The resin composition for golf balls of the present invention may further contain additives such as pigments including white pigments (e.g. titanium oxide) and blue pigments, weighting agents, dispersants, antioxidants, ultraviolet absorbents, light stabilizers, fluorescent materials, and fluorescent brighteners as long as the performance of golf balls is not impaired. Furthermore, in the resin composition for golf balls of the present invention, for example, a fatty acid and/or a metal salt thereof may be used in combination as long as the effects of the present invention are not impaired.

The amount of white pigment (e.g. titanium oxide) for each 100 parts by mass of the resin component is preferably 0.5 parts by mass or more, and more preferably 1 part by mass or more. The amount is also preferably 10 parts by mass or less, and more preferably 8 parts by mass or less. When the amount is 0.5 parts by mass or more, hiding properties can be provided to resulting golf ball members. If the amount is more than 10 parts by mass, golf balls having lower durability may be obtained.

The resin composition for golf balls of the present invention may be prepared, for example, by dry-blending the component (A), the component (B), and the component (C), and optionally the component (D). Moreover, the dry-blended mixture may be extruded into pellets. The dry-blending is preferably performed with, for example, a mixer that can mix pelletized materials, more preferably a tumbler mixer. The extrusion may be performed with a known extruder such as a single-screw extruder, a twin-screw extruder, or a twin-screw/single-screw extruder.

The resin composition for golf balls of the present invention preferably has a spin-lattice relaxation time of $^{13}C$ nuclei (T1), measured by high-resolution solid-state $^{13}C$ nuclear magnetic resonance (NMR) spectroscopy, of 15 seconds or shorter, more preferably 12 seconds or shorter, still more preferably 10 seconds or shorter, and further preferably 8 seconds or shorter. When the decay of magnetization is measured in an ionomer resin based on the spin-lattice relaxation time of $^{13}C$ nuclei (T1) measured by high-resolution solid-state $^{13}C$ nuclear magnetic resonance (NMR) spectroscopy, the spin-lattice relaxation time of $^{13}C$ nuclei (T1) is considered to reflect the trans conformation of the ethylene chains. The inventors of the present invention have considered that the moieties that may have a trans conformation include the polyethylene crystals and the restricted ethylene chain layer around each ionic aggregate, and thus the relaxation components in the measurement of the decay of magnetization can also be divided into a short-time component and a long-time component. Based on this consideration, they have found that the restricted ethylene chain layer correlates with resilience. In other words, the shorter the spin-lattice relaxation time of $^{13}C$ nuclei (T1) is, the higher the mobility of the restricted ethylene chain layer is and, in turn, the more enhanced the resilience is. Further, an increase in molecular mobility is expected to cause the effect of increasing flexibility. Therefore, the resin composition for golf balls of the present invention preferably has a spin-lattice relaxation time of $^{13}C$ nuclei (T1), measured by high-resolution solid-state $^{13}C$ nuclear magnetic resonance (NMR) spectroscopy, as short as described above.

The resin composition for golf balls of the present invention preferably has a storage modulus E' (Pa) and a loss modulus E" (Pa) which satisfy the following inequality when measured with a dynamic viscoelasticity apparatus in a tensile mode at a vibration frequency of 10 Hz, a temperature of 12° C., and a measurement strain of 0.05%.

The resin composition for golf balls satisfying the following inequality can achieve high resilience while maintaining a high level of softness. In the inequality, the symbol "log" means the common logarithm.

$$\log(E'/E''^2) \geq -6.55$$

It is considered that the higher the storage modulus E' (Pa) is or the lower the loss modulus E" (Pa) is, the higher the resilience is. Moreover, the higher the storage modulus E' (Pa) is, the higher the hardness is. In the above inequality, the numerator is the first power of the storage modulus E' (Pa), whereas the denominator is the second power of the loss modulus E" (Pa). This means that, for enhancing resilience, it is more effective to reduce loss modulus E" (Pa) than to increase storage modulus E' (Pa) so as to increase hardness. In other words, it is considered that what is necessary to enhance resilience without hardening the material is to reduce loss modulus E" (Pa) to thereby reduce energy loss upon deformation. In the present invention, since the increase in molecular mobility as described above enables the material to be smoothly deformed under stress, it is considered that energy loss is small and thus resilience is enhanced.

The $\log(E'/E''^2)$ value is preferably −6.23 or higher, more preferably −6.02 or higher, and still more preferably −5.89 or higher. Also, the upper limit of $\log(E'/E''^2)$ is not particularly limited, and is preferably −5.24 or lower, and more preferably −5.40 or lower. This is because, if the $\log(E'/E''^2)$ value comes to −5.25, the coefficient of restitution becomes close to the maximum value of 1. The dynamic viscoelasticity is measured at a vibration frequency of 10 Hz and a temperature of 12° C. for the following reason. The period of contact between a golf ball and an impact bar (metal cylinder) is 500 μsec in the measurement of coefficient of restitution at 40 m/s. If this contact is assumed to correspond to deformation in one cycle, this deformation corresponds to deformation at a frequency of several thousand hertz. Based on the frequency-temperature superposition principle of general ionomer resin, the dynamic viscoelasticity measured at room temperature and at a vibration frequency of several thousand hertz corresponds to the dynamic viscoelasticity measured at a temperature of 12° C. and a vibration frequency of 10 Hz.

The resin composition for golf balls of the present invention preferably has a melt flow rate (190° C., 2.16 kg) of 1.0 g/10 min or higher, more preferably 1.5 g/10 min or higher, and still more preferably 2.0 g/10 min or higher. The melt flow rate is preferably 100 g/10 min or lower, more preferably 80 g/10 min or lower, and still more preferably 50 g/10 min or lower. When the melt flow rate falls within the range mentioned above, the composition can exhibit good moldability into golf ball members.

The resin composition for golf balls preferably has a rebound resilience of 60% or higher, more preferably 65% or higher, still more preferably 70% or higher, and particularly preferably 75% or higher. The use of the resin composition for golf balls having a rebound resilience of 60% or higher enables golf balls excellent in resilience (flight distance) to be produced. The rebound resilience of the resin composition for golf balls herein is a rebound resilience measured after the resin composition for golf balls is formed into a sheet, and is measured by the method mentioned later.

The resin composition for golf balls preferably has a slab hardness, measured in Shore D hardness, of 20 or higher, more preferably 30 or higher, still more preferably 40 or higher, and particularly preferably 50 or higher. Also, the slab hardness (Shore D hardness) is preferably 80 or lower, more preferably 75 or lower, and still more preferably 70 or lower. The use of the resin composition for golf balls having a slab hardness of 20 or higher enables golf balls excellent in resilience (flight distance) to be produced, whereas the use of the resin composition for golf balls having a slab hardness of 80 or lower enables golf balls excellent in durability to be produced. The slab hardness of the resin composition for golf balls herein is a hardness measured after the resin composition for golf balls is formed into a sheet, and is measured by the method mentioned later.

The golf ball of the present invention is not particularly limited as long as it includes a member formed from the resin composition for golf balls mentioned above. Examples thereof include one-piece golf balls; two-piece golf balls which include a monolayer core and a cover disposed to cover the monolayer core; three-piece golf balls which include a core having a center and an intermediate monolayer disposed to cover the center, and a cover disposed to cover the core; and multi-piece golf balls (including the three-piece golf balls) which include a core having a center and one or more intermediate layers disposed to cover the center, and a cover disposed to cover the core, provided that any member in each of these golf balls is formed from the resin composition for golf balls of the present invention. Preferred embodiments among these are: golf balls including a mono- or multi-layered core and a cover covering the core, at least one layer of the core being formed from the resin composition for golf balls; and one-piece golf balls including a golf ball body that is formed from the resin composition for golf balls. Particularly preferred embodiments are: two-piece golf balls including a monolayer core and a cover disposed to cover the monolayer core, the monolayer core being formed from the resin composition for golf balls; and multi-piece golf balls including a core having a center and one or more intermediate layers disposed to cover the center, and a cover disposed to cover the core, the center being formed from the resin composition for golf balls.

The following illustrates the golf ball of the present invention by reference to, but not limited to, embodiments of two-piece golf balls including a core and a cover disposed to cover the core, the core being formed from the aforementioned resin composition for golf balls.

The core may be formed by, for example, injection-molding the resin composition for golf balls. Specifically, the injection-molding is preferably performed by heat-melting the resin composition for golf balls at 160° C. to 260° C., and injecting it into a mold clamped under a pressure of 1 to 100 MPa, over 1 to 100 seconds, followed by cooling for 30 to 300 seconds, and then opening the mold.

The core preferably has a spherical shape. If the core is not spherical, then the cover may have a non-uniform thickness, resulting in its portion having poor covering performance.

The core preferably has a diameter of 39.00 mm or greater, more preferably 39.25 mm or greater, and still more preferably 39.50 mm or greater. The diameter is also preferably 42.37 mm or smaller, more preferably 42.22 mm or smaller, and still more preferably 42.07 mm or smaller. When the diameter is 39.00 mm or greater, the cover layer will not have too great a thickness, resulting in good resilience. Conversely, when the diameter is 42.37 mm or smaller, the cover layer will not have too small a thickness, allowing the cover to exert sufficient protection function.

In the case of the core having a diameter of 39.00 to 42.37 mm, the amount of compression deformation (shrink in the compression direction) of the core when compressed from an initial load of 98 N to a final load of 1275 N is preferably 1.00 mm or greater, and more preferably 1.10 mm or greater. The amount of compression deformation is also preferably 5.00 mm or smaller, more preferably 4.90 mm or smaller, and still more preferably 4.80 mm or smaller. When the amount of compression deformation is 1.00 mm or greater, a good shot feeling can be obtained. When the amount of compression deformation is 5.00 mm or smaller, good resilience can be obtained.

The core preferably has a surface hardness, measured in Shore D hardness, of 20 or higher, more preferably 25 or higher, and still more preferably 30 or higher. The surface hardness (Shore D hardness) is also preferably 70 or lower, and more preferably 69 or lower. When the surface hardness is 20 or higher, the core is not too soft and thus good resilience can be obtained. When the surface hardness is 70 or lower, the core is not too hard and thus a good shot feeling can be obtained.

The core preferably has a central hardness, measured in Shore D hardness, of 5 or higher, more preferably 7 or higher, and still more preferably 10 or higher. If the central hardness is lower than 5, the core may be too soft, resulting in lower resilience. Also, the core preferably has a central hardness, measured in Shore D hardness, of 50 or lower, more preferably 48 or lower, and still more preferably 46 or lower. If the central hardness exceeds 50, the core tends to be too hard, leading to a deteriorated shot feeling. In the present invention, the central hardness of the core means a hardness measured as follows: the core is cut into two equal parts, and the hardness of the part is measured at the central point of the cut plane with a spring type Shore D hardness tester.

The core may preferably further contain a filler. A filler is used mainly as a weighting agent for adjusting the density of a golf ball to be obtained as the final product within the range of 1.0 to 1.5, and it may be added as needed. Examples of the fillers include inorganic fillers such as zinc oxide, barium sulfate, calcium carbonate, magnesium oxide, tungsten powder, and molybdenum powder. The amount of filler for each 100 parts by mass of the resin component is preferably 0.5 parts by mass or more, and more preferably 1.0 part by mass or more. The amount is also preferably 30 parts by mass or less, and more preferably 20 parts by mass or less. If the amount of filler is less than 0.5 parts by mass, it tends to be difficult to adjust the weight. If the amount exceeds 30 parts by mass, the weight fraction of the resin component tends to be reduced so that resilience can decrease.

The cover of the golf ball of the present invention is preferably formed from a cover composition containing a resin component. Examples of resins that may be contained in the resin component include various resins such as ionomer resins, polyester resins, urethane resins (e.g. thermoplastic urethane resins, two-pack curable urethane resins), and polyamide resins; thermoplastic polyamide elastomers available from Arkema under the trade name "Pebax (registered trademark) (elastomers)" (e.g. "Pebax 2533")"; thermoplastic polyester elastomers available from Du Pont-Toray Co., Ltd. under the trade name "Hytrel (registered trademark) (e.g. "Hytrel 3548", "Hytrel 4047")"; thermoplastic polyurethane elastomers available from BASF Japan Ltd. under the trade name "Elastollan (registered trademark) (e.g. "Elastollan XNY 97A")"; and thermoplastic styrene elastomers available from Mitsubishi Chemical Corp. under the trade name "RABALON (registered trademark)". These resins may be used alone, or two or more of these may be used in admixture.

Preferred examples of ionomer resins that can be used in the cover of the golf ball include those listed for the component (a-2) or the component (a-4).

The cover composition forming the cover of the golf ball more preferably contains a polyurethane resin (including a polyurethane elastomer) or an ionomer resin as the resin component. The amount of polyurethane resin or ionomer resin is preferably 50% by mass or more, more preferably 60% by mass or more, and still more preferably 70% by mass or more of the resin component of the cover composition.

In addition to the aforementioned resin component, the cover composition may further contain additives including: a pigment component such as white pigments (e.g. titanium oxide), blue pigments, and red pigments; zinc oxide; weighting agents such as calcium carbonate and barium sulfate; dispersants; antioxidants; ultraviolet absorbents; light stabilizers; fluorescent materials; and fluorescent brighteners, to the extent that they do not impair the performance of the cover.

The amount of white pigment (e.g. titanium oxide) for each 100 parts by mass of the resin component forming the cover is preferably 0.5 parts by mass or more, and more preferably 1 part by mass or more. The amount is also preferably 10 parts by mass or less, and more preferably 8 parts by mass or less. When the amount of white pigment is 0.5 parts by mass or more, hiding properties can be provided to the cover. If the amount exceeds 10 parts by mass, the resulting cover may have lower durability.

Examples of the method for forming the cover of the golf ball of the present invention include: a compression molding method in which hollow shells are formed from the cover composition, the core is covered with the plurality of shells, and then the assembly is compression-molded (preferably, hollow half shells are formed from the cover composition, the core is covered with the two half shells, and then the assembly is compression-molded); and an injection molding method in which the cover composition is directly injection-molded on the core.

In the case of forming a cover by injection-molding the cover composition, the pelletized cover composition, which is prepared by extrusion in advance, may be injection-molded, or alternatively the materials for the cover such as a base resin component and a pigment may be dry-blended and then directly injection-molded. The upper and lower molds for forming the cover each preferably have a hemispherical cavity with pimples a part of which also serve as retractable hold pins. The cover can be formed by injection molding as follows: the hold pins are protruded; the core is put into the mold and held by the pins; and then the cover composition is injected thereon and cooled. More specifically, it is preferable that the mold is clamped under a pressure of 9 to 15 MPa, the cover composition heated to 200° C. to 250° C. is injected into the mold over 0.5 to 5 seconds, and than cooled for 10 to 60 seconds, and the mold is opened.

In forming a cover, indentations called dimples are usually formed on the surface. The cover preferably has 200 to 500 dimples in total. If the total number of dimples is less than 200, the effect of dimples is less likely to be achieved. Also, if the total number of dimples exceeds 500, then the individual size of the dimples becomes small and thus the effect of dimples is less likely to be achieved. The shape (in a plan view) of each dimple to be formed is not particularly limited, and examples thereof include a circular shape; polygonal shapes such as a substantially triangular shape, substantially quadrangular shape, substantially pentagonal shape, and substantially hexagonal shape; and other irregular shapes. These shapes may be used singly or in combination of two or more.

The cover preferably has a thickness of 2.0 mm or smaller, more preferably 1.6 mm or smaller, still more preferably 1.2 mm or smaller, and particularly preferably 1.0 mm or smaller. When the thickness is 2.0 mm or smaller, golf balls having better resilience and shot feeling can be obtained. The cover also preferably has a thickness of 0.1 mm or greater, more preferably 0.2 mm or greater, and still more preferably 0.3 mm or greater. If the thickness is smaller than 0.1 mm, it may be difficult to form such a cover; moreover, the cover may have lower durability or abrasion resistance.

After the cover is formed, the golf ball body is taken out of the mold, and is preferably subjected to a surface treatment such as deburring, cleaning, and sandblasting, as necessary. If desired, a paint layer or a mark may be formed on the surface. The paint layer may have any thickness and preferably has a thickness of 5 μm or greater, more preferably 7 μm or greater. The paint layer also preferably has a thickness of 25 μm or smaller, more preferably 18 μm or smaller. If the thickness is smaller than 5 μm, the paint layer tends to easily wear out and disappear after continuous use. If the thickness exceeds 25 μm the effect of dimples tends to be reduced so that resulting golf balls can have a lower flight performance.

The amount of compression deformation (shrink in the compression direction) of the golf ball of the present invention when compressed from an initial load of 98 N to a final load of 1275 N is preferably 2.0 mm or greater, and more preferably 2.2 mm or greater. The amount of compression deformation is also preferably 4.0 mm or smaller, and more preferably 3.5 mm or smaller. The golf ball with an amount of compression deformation of 2.0 mm or greater is not too hard and can give a good shot feeling, whereas the golf ball with an amount of compression deformation of 4.0 mm or smaller has high resilience.

The above description explains the embodiments in which the resin composition for golf balls of the present invention is used in a core. The resin composition for golf balls of the present invention can also be used in a center, an intermediate layer, or a cover. In the case where a center is formed from the resin composition for golf balls of the present invention, an intermediate layer may be formed from, for example, a resin component as listed above for the cover.

EXAMPLES

The present invention will be described in greater detail referring to, but not limited to, examples.

[Evaluation Methods]

(1) Slab Hardness (Shore D Hardness)

A resin composition for golf balls was hot press-molded into sheets having a thickness of about 2 mm, which were then stored at 23° C. for 2 weeks. Three or more sheets were stacked on one another so as not to be affected by the measurement substrate and the like, and the slab hardness of the stack was measured with a P1-series auto rubber hardness tester (from KOBUNSHI KEIKI CO., LTD.) including a spring type Shore D hardness tester in conformity with ASTM-D 2240.

(2) Melt Flow Rate (MFR) (g/10 min)

MFR was measured with a flow tester (Shimadzu Flowtester CFT-100C, Shimadzu Corp.) in conformity with JIS K 7210. The measurement was performed at a measurement temperature of 190° C. and a load of 2.16 kg.

(3) Rebound Resilience (%)

A resin composition for golf balls was hot press-molded into a sheet having a thickness of about 2 mm, and then circular pieces having a diameter of 28 mm were punched out of this sheet. Six pieces were stacked to prepare a cylindrical specimen having a thickness of about 12 mm and a diameter of 28 mm. This specimen was subjected to a Lupke rebound resilience test (at a temperature of 23° C. and a humidity of 50 RH %). The specimen preparation and the testing method employed were inconformity with JIS K 6255.

(4) Amount of Compression Deformation

The amount of deformation in the compression direction (the amount of shrink in the compression direction) of a spherical body when compressed from an initial load of 98 N to a final load of 1275 N was measured. The amounts of compression deformation of spherical bodies are expressed as ratios relative to: the amount of compression deformation in Comparative Example 8 in Tables 1 and 2; the amount of compression deformation in Comparative Example 29 in Table 3; and the amount of compression deformation in Comparative Example 37 in Table 4.

(5) Coefficient of Restitution

A 198.4-g metal cylinder was allowed to collide with each spherical body at a speed of 40 m/s. The speeds of the cylinder and the golf ball before and after the collision were measured. Based on these speeds and the weight of each golf ball, the coefficient of restitution of the golf balls was calculated. For each kind of spherical body, 12 pieces were measured and the average value was reported as the coefficient of restitution for the kind of spherical body.

(6) Shot Feeling

Each golf ball was subjected to a hitting test by 10 amateur (advanced) golfers using a driver, and the golfers evaluated the ball for the feeling when hitting it, according to the following criteria. The most common grade among the grades given by the 10 golfers was used as the shot feeling of the golf ball.

Criteria for Grades
Excellent: small impact and good feeling
Good: ordinary levels
Poor: large impact and poor feeling (7) Method of Measuring Spin-Lattice Relaxation Time of $^{13}C$ Nuclei (T1) by High-Resolution Solid-State $^{13}C$ Nuclear Magnetic Resonance (NMR) Spectroscopy
Device: Bruker Avance 400
Measurement method: T1 relaxation time measurement by Torchia method
Measurement frequency: 100.6256207 MHz
Measurement temperature: room temperature
Standard substance: adamantane
Magic angle spinning rate: 5000 Hz
Pulse width: 4.80 μsec
Contact time: 2000 μsec
Pulse interval: 1 μsec, 100 msec, 500 msec, 1 sec, 2 sec, 3 sec, 4 sec, 6 sec, 8 sec, 10 sec, 12 sec, 15 sec, 20 sec, 40 sec, 80 sec, and 120 sec
Magnetic field strength: 9.4 T (8) Measurement of Storage Modulus E' (Pa) and Loss Modulus E" (Pa)

The storage modulus E' (Pa) and loss modulus E" (Pa) of a resin composition for golf balls were measured under the following conditions.
Device: dynamic viscoelasticity apparatus Rheogel-E 4000 (available from UBM)
Measurement sample: a 4-mm-wide specimen (distance between clamps: 20 mm) cut out of a 2-mm-thick sheet that was prepared by press-molding the resin composition for golf balls
Measurement mode: Tensile
Measurement temperature: 12° C.
Vibration frequency: 10 Hz
Measurement strain: 0.05%

[Preparation of Spherical Body (Core)]

According to each of the formulations shown in Tables 1 to 4, the materials were dry-blended and mixed with a twin-screw kneading extruder. Then, the mixture was extruded into cold water to form a strand. The extruded strand was cut into pellets with a pelletizer, whereby a pelletized resin composition for golf balls was prepared. The extrusion was performed with a screw diameter of 45 mm, a screw rotation rate of 200 rpm, and a screw L/D ratio of 35. The mixture was heated to 160° C. to 230° C. in the die of the extruder. The pelletized resin composition for golf balls was injection-molded at 220° C. to obtain a spherical body (core) having a diameter of 40 mm.

TABLE 1

| | | | Example | | | | Comparative Example | | | | | | | |
|---|---|---|---|---|---|---|---|---|---|---|---|---|---|---|
| | | | 1 | 2 | 3 | 4 | 1 | 2 | 3 | 4 | 5 | 6 | 7 | 8 |
| Formulation | NUCREL N1560 (binary) | | 100.0 | 100.0 | 100.0 | 100.0 | 100.0 | 100.0 | 100.0 | 100.0 | 100.0 | 100.0 | 100.0 | 100.0 |
| | Magnesium hydroxide | | 18.4 | 18.1 | 17.4 | 16.3 | 18.0 | 17.3 | 18.1 | 17.4 | 18.0 | 17.3 | 18.4 | 7.7 |
| | Plasticizer | Oleic acid | 99.0 | 97.0 | 90.0 | 80.0 | — | — | 97.0 | 90.0 | — | — | 100.0 | — |
| | | Stearic acid | — | — | — | — | 97.0 | 90.0 | — | — | 97.0 | 90.0 | — | — |
| | Resilience-enhancing agent | Oleyl betaine | 1.0 | 3.0 | 10.0 | 20.0 | 3.0 | 10.0 | — | — | — | — | — | 100.0 |
| | | Stearyl betaine | — | — | — | — | — | — | 3.0 | 10.0 | 3.0 | 10.0 | — | — |
| Resilience-enhancing agent/Plasticizer | | | 1/99 | 3/97 | 10/90 | 20/80 | 3/97 | 10/90 | 3/97 | 10/90 | 3/97 | 10/90 | — | — |
| Physical properties | Total degree of neutralization (%) | | 120% | 120% | 120% | 120% | 120% | 120% | 120% | 120% | 120% | 120% | 120% | 120% |
| | MFR (g/10 min) | | 5.5 | 5.0 | 3.0 | 2.0 | 1.5 | 2.5 | 2.0 | 1.8 | 1.5 | 2.0 | 6.8 | 0.1 |

TABLE 1-continued

|  | | Example | | | | Comparative Example | | | | | | | |
|---|---|---|---|---|---|---|---|---|---|---|---|---|---|
|  | | 1 | 2 | 3 | 4 | 1 | 2 | 3 | 4 | 5 | 6 | 7 | 8 |
| | Shore D hardness | 56 | 55 | 53 | 52 | 52 | 53 | 55 | 52 | 50 | 53 | 60 | 50 |
| | Rebound resilience (%) | 74 | 80 | 82 | 74 | 69 | 70 | 65 | 68 | 60 | 65 | 53 | 74 |
| | Log(E'/E''$^2$) | −5.41 | −5.18 | −5.10 | −5.41 | −5.60 | −5.56 | −5.75 | −5.64 | −5.94 | −5.75 | −6.21 | −5.41 |
| | $T_1$ relaxation time (sec) | 2.7 | 1.9 | 1.7 | 2.7 | 3.7 | 3.5 | 4.7 | 3.9 | 6.4 | 4.7 | 9.9 | 2.7 |
| | Amount of compression deformation | 0.76 | 0.80 | 0.87 | 0.91 | 0.91 | 0.87 | 0.80 | 0.91 | 1.00 | 0.87 | 0.65 | 1.00 |
| | Coefficient of restitution | 0.915 | 0.978 | 0.999 | 0.915 | 0.862 | 0.873 | 0.820 | 0.851 | 0.767 | 0.820 | 0.694 | 0.915 |
| | Shot feeling | Good | Excellent | Excellent | Good | Good | Good | Good | Good | Good | Good | Good | Good |

TABLE 2

|  |  |  | Example | | | | Comparative Example | | | | | |
|---|---|---|---|---|---|---|---|---|---|---|---|---|
|  |  |  | 5 | 6 | 7 | 8 | 9 | 10 | 11 | 12 | 13 | 14 |
| Formulation | NUCREL N1560 (binary) | | 100.0 | 100.0 | 100.0 | 100.0 | 100.0 | 100.0 | 100.0 | 100.0 | 100.0 | 100.0 |
| | Magnesium hydroxide | | 14.4 | 17.4 | 29.5 | 32.6 | 17.3 | 29.4 | 17.4 | 29.5 | 17.3 | 29.4 |
| | Plasticizer | Oleic acid | 90.0 | 90.0 | 90.0 | 90.0 | — | — | 90.0 | 90.0 | — | — |
| | | Stearic acid | — | — | — | — | 90.0 | 90.0 | — | — | 90.0 | 90.0 |
| | Resilience-enhancing agent | Oleyl betaine | 10.0 | 10.0 | 10.0 | 10.0 | 10.0 | 10.0 | — | — | — | — |
| | | Stearyl betaine | — | — | — | — | — | — | 10.0 | 10.0 | 10.0 | 10.0 |
| Resilience-enhancing agent/Plasticizer | | | 10/90 | 10/90 | 10/90 | 10/90 | 10/90 | 10/90 | 10/90 | 10/90 | 10/90 | 10/90 |
| Physical properties | Total degree of neutralization (%) | | 100% | 120% | 200% | 220% | 120% | 200% | 120% | 200% | 120% | 200% |
| | MFR (g/10 min) | | 1.7 | 3.0 | 2.0 | 1.5 | 2.5 | 1.0 | 1.8 | 0.9 | 2.0 | 1.5 |
| | Shore D hardness | | 55 | 53 | 53 | 60 | 53 | 55 | 52 | 53 | 53 | 54 |
| | Rebound resilience (%) | | 74 | 82 | 80 | 76 | 70 | 71 | 68 | 70 | 65 | 67 |
| | Log(E'/E''$^2$) | | −5.41 | −5.10 | −5.18 | −5.33 | −5.56 | −5.52 | −5.64 | −5.56 | −5.75 | −5.67 |
| | $T_1$ relaxation time (sec) | | 2.7 | 1.7 | 1.9 | 2.4 | 3.5 | 3.3 | 3.9 | 3.5 | 4.7 | 4.2 |
| | Amount of compression deformation | | 0.80 | 0.87 | 0.87 | 0.65 | 0.87 | 0.80 | 0.91 | 0.87 | 0.87 | 0.83 |
| | Coefficient of restitution | | 0.915 | 0.999 | 0.978 | 0.936 | 0.873 | 0.883 | 0.851 | 0.873 | 0.820 | 0.841 |
| | Shot feeling | | Excellent | Excellent | Excellent | Excellent | Good | Excellent | Good | Good | Good | Good |

TABLE 3

|  |  |  | Example | | | | | | Comparative Example | | | | |
|---|---|---|---|---|---|---|---|---|---|---|---|---|---|
|  |  |  | 9 | 10 | 11 | 12 | 13 | 14 | 15 | 16 | 17 | 18 | 19 |
| Formulation | NUCREL N1560 (binary) | | 100.0 | 100.0 | 100.0 | 100.0 | 100.0 | 100.0 | 100.0 | 100.0 | 100.0 | 100.0 | 100.0 |
| | Magnesium hydroxide | | 17.5 | 16.8 | 15.8 | 18.0 | 17.4 | 16.3 | 18.0 | 17.3 | 16.3 | 17.5 | 16.8 |
| | Plasticizer | Linoleic acid | — | — | — | 97.0 | 90.0 | 80.0 | — | — | — | — | — |
| | | Ricinoleic acid | 97.0 | 90.0 | 80.0 | — | — | — | — | — | — | 97.0 | 90.0 |
| | | Stearic acid | — | — | — | — | — | — | 97.0 | 90.0 | 80.0 | — | — |
| | Resilience-enhancing agent | Oleyl betaine | 3.0 | 10.0 | 20.0 | 3.0 | 10.0 | 20.0 | 3.0 | 10.0 | 20.0 | — | — |
| | | Stearyl betaine | — | — | — | — | — | — | — | — | — | 3.0 | 10.0 |

TABLE 3-continued

| | | | | | | | | | | | |
|---|---|---|---|---|---|---|---|---|---|---|---|
| Resilience-enhancing agent/Plasticizer | | 3/97 | 10/90 | 20/80 | 3/97 | 10/90 | 20/80 | 3/97 | 10/90 | 20/80 | 3/97 | 10/90 |
| Physical properties | Total degree of neutralization (%) | 120% | 120% | 120% | 120% | 120% | 120% | 120% | 120% | 120% | 120% |
| | MFR (g/10 min) | 2.0 | 1.5 | 1.0 | 3.0 | 2.0 | 1.0 | 1.5 | 2.5 | 1.8 | 1.8 | 1.5 |
| | Shore D hardness | 50 | 53 | 55 | 55 | 56 | 54 | 52 | 53 | 53 | 50 | 53 |
| | Rebound resilience (%) | 72 | 74 | 76 | 72 | 76 | 74 | 69 | 70 | 68 | 60 | 62 |
| | Log(E'/E''$^2$) | −5.48 | −5.41 | −5.33 | −5.48 | −5.33 | −5.41 | −5.60 | −5.56 | −5.64 | −5.94 | −5.86 |
| | $T_1$ relaxation time (sec) | 3.1 | 2.7 | 2.4 | 3.1 | 2.4 | 2.7 | 3.7 | 3.5 | 3.9 | 6.4 | 5.7 |
| | Amount of compression deformation | 1.00 | 0.87 | 0.80 | 0.80 | 0.76 | 0.83 | 0.91 | 0.87 | 0.87 | 1.00 | 0.87 |
| | Coefficient of restitution | 0.894 | 0.915 | 0.936 | 0.894 | 0.936 | 0.915 | 0.862 | 0.873 | 0.851 | 0.767 | 0.788 |
| | Shot feeling | Good | Good | Excellent | Excellent | Excellent | Excellent | Good | Good | Good | Good | Good |

| | | | Comparative Example | | | | | | | | | |
|---|---|---|---|---|---|---|---|---|---|---|---|---|
| | | | 20 | 21 | 22 | 23 | 24 | 25 | 26 | 27 | 28 | 29 |
| Formulation | NUCREL N1560 (binary) | | 100.0 | 100.0 | 100.0 | 100.0 | 100.0 | 100.0 | 100.0 | 100.0 | 100.0 | 100.0 |
| | Magnesium hydroxide | | 15.8 | 18.2 | 17.4 | 16.4 | 18.0 | 17.3 | 16.1 | 18.4 | 17.8 | 7.7 |
| | Plasticizer | Linoleic acid | — | 97.0 | 90.0 | 80.0 | — | — | — | 100.0 | — | 0.0 |
| | | Ricinoleic acid | 80.0 | — | — | — | — | — | — | — | 100.0 | — |
| | | Stearic acid | — | — | — | — | 97.0 | 90.0 | 80.0 | — | — | — |
| | Resilience-enhancing agent | Oleyl betaine | — | — | — | — | — | — | — | — | — | 100.0 |
| | | Stearyl betaine | 20.0 | 3.0 | 10.0 | 20.0 | 3.0 | 10.0 | 20.0 | — | — | — |
| Resilience-enhancing agent/Plasticizer | | | 20/80 | 3/97 | 10/90 | 20/80 | 3/97 | 10/90 | 20/80 | — | — | — |
| Physical properties | Total degree of neutralization (%) | | 120% | 120% | 120% | 120% | 120% | 120% | 120% | 120% | 120% | 120% |
| | MFR (g/10 min) | | 1.0 | 2.8 | 2.0 | 1.0 | 1.5 | 2.0 | 1.5 | 6.7 | 5.0 | 0.1 |
| | Shore D hardness | | 55 | 55 | 56 | 54 | 50 | 53 | 55 | 60 | 55 | 50 |
| | Rebound resilience (%) | | 63 | 65 | 66 | 60 | 60 | 65 | 68 | 53 | 50 | 74 |
| | Log(E'/E''$^2$) | | −5.83 | −5.75 | −5.71 | −5.94 | −5.94 | −5.75 | −5.64 | −6.21 | −6.32 | −5.41 |
| | $T_1$ relaxation time (sec) | | 5.4 | 4.7 | 4.5 | 6.4 | 6.4 | 4.7 | 3.9 | 9.9 | 11.9 | 2.7 |
| | Amount of compression deformation | | 0.80 | 0.80 | 0.76 | 0.83 | 1.00 | 0.87 | 0.80 | 0.65 | 0.80 | 1.00 |
| | Coefficient of restitution | | 0.799 | 0.820 | 0.830 | 0.767 | 0.767 | 0.820 | 0.851 | 0.694 | 0.662 | 0.915 |
| | Shot feeling | | Good | Good | Excellent | Good | Good | Good | Good | Good | Good | Good |

TABLE 4

| | | | Example | | | | | Comparative Example | |
|---|---|---|---|---|---|---|---|---|---|
| | | | 15 | 16 | 17 | 18 | 19 | 30 | 31 |
| Formulation | NUCREL AN4319 (ternary) | | 100.0 | 100.0 | 100.0 | 100.0 | 100.0 | 100.0 | 100.0 |
| | Magnesium hydroxide | | 15.5 | 15.3 | 14.6 | 13.5 | 11.9 | 15.2 | 14.4 |
| | Plasticizer | Oleic acid | 99.0 | 97.0 | 90.0 | 80.0 | 70.0 | — | — |
| | | Stearic acid | — | — | — | — | — | 97.0 | 90.0 |
| | Resilience-enhancing agent | Oleyl betaine | 1.0 | 3.0 | 10.0 | 20.0 | 30.0 | 3.0 | 10.0 |
| | | Stearyl betaine | — | — | — | — | — | — | — |
| Resilience-enhancing agent/Plasticizer | | | 1/99 | 3/97 | 10/90 | 20/80 | 30/70 | 3/97 | 10/90 |
| Physical properties | Total degree of neutralization (%) | | 120% | 120% | 120% | 120% | 120% | 120% | 120% |
| | MFR (g/10 min) | | 4.0 | 4.0 | 3.5 | 1.8 | 0.8 | 2.0 | 2.5 |
| | Shore D hardness | | 68 | 67 | 66 | 64 | 60 | 55 | 56 |
| | Rebound resilience (%) | | 74 | 78 | 81 | 77 | 76 | 68 | 70 |

TABLE 4-continued

| | | | | | | | |
|---|---|---|---|---|---|---|---|
| Log(E'/E"$^2$) | −5.41 | −5.26 | −5.14 | −5.29 | −5.33 | −5.64 | −5.56 |
| T$_1$ relaxation time (sec) | 2.7 | 2.1 | 1.8 | 2.3 | 2.4 | 3.9 | 3.5 |
| Amount of compression deformation | 0.74 | 0.77 | 0.80 | 0.86 | 1.00 | 1.23 | 1.18 |
| Coefficient of restitution | 0.915 | 0.957 | 0.988 | 0.946 | 0.936 | 0.851 | 0.873 |
| Shot feeling | Good | Excellent | Excellent | Excellent | Good | Good | Good |

| | | | Comparative Example | | | | | |
|---|---|---|---|---|---|---|---|---|
| | | | 32 | 33 | 34 | 35 | 36 | 37 |
| Formulation | NUCREL AN4319 (ternary) | | 100.0 | 100.0 | 100.0 | 100.0 | 100.0 | 100.0 |
| | Magnesium hydroxide | | 15.3 | 14.5 | 15.2 | 14.5 | 15.6 | 4.9 |
| | Plasticizer | Oleic acid | 97.0 | 90.0 | — | — | 100.0 | — |
| | | Stearic acid | — | — | 97.0 | 90.0 | — | — |
| | Resilience-enhancing agent | Oleyl betaine | — | — | — | — | — | 100.0 |
| | | Stearyl betaine | 3.0 | 10.0 | 3.0 | 10.0 | — | — |
| Resilience-enhancing agent/Plasticizer | | | 3/97 | 10/90 | 3/97 | 10/90 | — | — |
| Physical properties | Total degree of neutralization (%) | | 120% | 120% | 120% | 120% | 120% | 120% |
| | MFR (g/10 min) | | 1.7 | 2.5 | 1.5 | 2.0 | 3.0 | 0.2 |
| | Shore D hardness | | 60 | 62 | 55 | 56 | 67 | 60 |
| | Rebound resilience (%) | | 70 | 71 | 63 | 64 | 69 | 65 |
| | Log(E'/E"$^2$) | | −5.56 | −5.52 | −5.83 | −5.79 | −5.60 | −5.75 |
| | T$_1$ relaxation time (sec) | | 3.5 | 3.3 | 5.4 | 5.0 | 3.7 | 4.7 |
| | Amount of compression deformation | | 1.00 | 0.92 | 1.23 | 1.18 | 0.77 | 1.00 |
| | Coefficient of restitution | | 0.873 | 0.883 | 0.799 | 0.809 | 0.841 | 0.767 |
| | Shot feeling | | Good | Excellent | Good | Good | Excellent | Good |

The materials shown in Tables 1 to 4 are as follows.

NUCREL N1560: ethylene-methacrylic acid copolymer (Du Pont-Mitsui Polychemicals Co., Ltd., melt flow rate (190° C., 2.16 kg): 60 g/10 min, bending rigidity: 83 MPa, methacrylic acid content: 15% by mass)

NUCREL AN4319: ethylene-methacrylic acid-butyl acrylate copolymer (Du Pont-Mitsui Polychemicals Co., Ltd., melt flow rate (190° C., 2.16 kg): 55 g/10 min, bending rigidity: 21 MPa, methacrylic acid content: 8% by mass)

Magnesium hydroxide: product of Wako Pure Chemical Industries, Ltd.

Oleic acid: product of Tokyo Chemical Industry Co., Ltd.

Stearic acid: powdery stearic acid "Tsubaki" (NOF Corp.)

Linoleic acid: product of Tokyo Chemical Industry Co., Ltd.

Ricinoleic acid: product of Tokyo Chemical Industry Co., Ltd.

Oleyl betaine: purified product (water- and salt-free) of "CHEMBETAINE OL" (The Lubrizol Corporation)

Stearyl betaine: purified product (water- and salt-free) of "AMPHITOL 86B" (Kao Corp.)

The results in Tables 1 to 4 indicate that the resin compositions of the examples containing the resin (A), the compound (B), and the unsaturated fatty acid (C) had higher fluidity while maintaining or improving resilience and flexibility as compared to the comparative examples. This clearly shows that the addition of the compound (B) and the unsaturated fatty acid (C) enables to provide golf balls which have excellent productivity while maintaining or improving resilience and shot feeling.

INDUSTRIAL APPLICABILITY

The present invention provides a resin composition for golf balls that is excellent in resilience, flexibility, and fluidity. The use of the resin composition enables golf balls excellent in resilience, shot feeling, and productivity to be produced.

The invention claimed is:

1. A resin composition for golf balls, comprising:
   (A) at least one selected from the group consisting of
      (a-1) a bipolymer of an olefin and a $C_3$-$C_8$ α,β-unsaturated carboxylic acid,
      (a-2) a metal ion-neutralized product of a bipolymer of an olefin and a $C_3$-$C_8$ α,β-unsaturated carboxylic acid,
      (a-3) a terpolymer of an olefin, a $C_3$-$C_8$ α,β-unsaturated carboxylic acid, and an α,β-unsaturated carboxylic acid ester, and
      (a-4) a metal ion-neutralized product of a terpolymer of an olefin, a $C_3$-$C_8$ α,β-unsaturated carboxylic acid, and an α,β-unsaturated carboxylic acid ester;
   (B) a compound containing an unsaturated hydrocarbon chain, a cationic moiety, and an anionic moiety in its molecule; and
   (C) an unsaturated fatty acid.

2. The resin composition according to claim 1,
wherein the compound (B) is an amphoteric surfactant.

3. The resin composition according to claim 2,
wherein the amphoteric surfactant is at least one selected from the group consisting of betaine amphoteric surfactants, amide amino acid amphoteric surfactants, alkylamino fatty acid salts, alkyl amine oxides, β-alanine amphoteric surfactants, glycine amphoteric surfactants, sulfobetaine amphoteric surfactants, and phosphobetaine amphoteric surfactants.

4. The resin composition according to claim 1,
wherein the unsaturated fatty acid (C) is at least one selected from the group consisting of oleic acid, linoleic acid, linolenic acid, elaidic acid, stearolic acid, ricinoleic acid, ricinelaidic acid, and their branched isomers.

5. The resin composition according to claim 1,
wherein the resin composition comprises the compound (B) in an amount of 1 to 200 parts by mass for each 100 parts by mass of a resin component of the resin composition.

6. The resin composition according to claim 1,
wherein the resin composition comprises the unsaturated fatty acid (C) in an amount of 1 to 200 parts by mass for each 100 parts by mass of a resin component of the resin composition.

7. The resin composition according to claim 1, comprising (D) a basic inorganic metal compound in an amount of 100 parts by mass or less for each 100 parts by mass of a resin component of the resin composition.

8. The resin composition according to claim 1,
wherein a mass ratio of the compound (B) to the unsaturated fatty acid (C) ranges from 0.5/99.5 to 30/70.

9. A golf ball, comprising:
a mono- or multi-layered core; and
a cover covering the core,
wherein at least one layer of the core is formed from the resin composition according to claim 1.

10. A one-piece golf ball, comprising a golf ball body formed from the resin composition according to claim 1.

* * * * *